(12) United States Patent
Hirano et al.

(10) Patent No.: US 12,370,878 B2
(45) Date of Patent: Jul. 29, 2025

(54) FLUID-FILLED VIBRATION DAMPING DEVICE

(71) Applicant: Sumitomo Riko Company Limited, Aichi (JP)

(72) Inventors: Masaaki Hirano, Aichi (JP); Takashi Kume, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 427 days.

(21) Appl. No.: 17/983,326

(22) Filed: Nov. 8, 2022

(65) Prior Publication Data

US 2023/0278413 A1    Sep. 7, 2023

(30) Foreign Application Priority Data

Mar. 4, 2022    (JP) .................................. 2022-033377

(51) Int. Cl.
*F16F 13/30*    (2006.01)
*B60K 5/12*    (2006.01)
(Continued)

(52) U.S. Cl.
CPC ............ *B60K 5/1283* (2013.01); *F16F 13/10* (2013.01); *F16F 13/305* (2013.01);
(Continued)

(58) Field of Classification Search
CPC ...... B60K 5/1283; F16F 13/10; F16F 13/305; F16F 2222/06; F16F 2222/12; F16F 2230/18; F16F 13/14
(Continued)

(56) References Cited

U.S. PATENT DOCUMENTS 6,565,072 B2 *   5/2003   Goto ...................... F16F 7/1011
                                                  267/140.14
7,905,470 B2 *   3/2011   Kojima ................. F16F 13/305
                                                  267/140.14
(Continued)

FOREIGN PATENT DOCUMENTS

CN         107061603        2/2019
DE          10117817       10/2002
DE        102011117749      5/2013

OTHER PUBLICATIONS

Office Action of Germany Counterpart Application, with English translation thereof, issued on Nov. 13, 2023, pp. 1-14.

*Primary Examiner* — Thomas W Irvin
(74) *Attorney, Agent, or Firm* — JCIPRNET

(57) ABSTRACT

In a fluid-filled vibration damping device in which multiple fluid chambers filled with a magnetic functional fluid communicate with each other by an orifice path, and a magnetic unit applying a magnetic field to the orifice path is provided in a state of being externally fitting to an outer cylindrical member, the magnetic unit includes a magnetic field generation part forming a magnetic field and a magnetic path formation part inducing a magnetic flux, the magnetic field is applied from a magnetic gap part of the magnetic path formation part arranged on an outer circumference of the orifice path to the orifice path, and on an outer circumferential surface of the outer cylindrical member, an outer mounting member linking between the outer cylindrical member and a vibration damping linking target member is installed to an installation part which is offset from the magnetic field generation part in an axial direction.

19 Claims, 5 Drawing Sheets

(51) Int. Cl.
 *F16F 13/10* (2006.01)
 *F16F 13/14* (2006.01)

(52) U.S. Cl.
 CPC ....... *F16F 2222/06* (2013.01); *F16F 2222/12* (2013.01); *F16F 2224/045* (2013.01); *F16F 2228/066* (2013.01); *F16F 2230/18* (2013.01)

(58) Field of Classification Search
 USPC .................................................. 267/140.15
 See application file for complete search history.

(56) References Cited

U.S. PATENT DOCUMENTS

| | | | | |
|---|---|---|---|---|
| 8,100,235 | B2* | 1/2012 | Loheide | F16F 13/305 |
| | | | | 267/140.3 |
| 11,156,263 | B2* | 10/2021 | Zehnder, II | F16F 13/106 |
| 11,193,532 | B2* | 12/2021 | Ito | F16F 9/535 |
| 11,274,725 | B2* | 3/2022 | Zehnder, II | B62D 21/11 |
| 11,371,579 | B2* | 6/2022 | Inoue | F16F 13/305 |
| 11,441,635 | B2* | 9/2022 | Ito | F16F 13/107 |
| 2020/0263731 | A1* | 8/2020 | Ito | F16F 9/535 |
| 2020/0263751 | A1* | 8/2020 | Ito | F16F 1/3615 |
| 2020/0263755 | A1* | 8/2020 | Ito | F16F 13/28 |
| 2020/0263756 | A1* | 8/2020 | Inoue | F16F 13/1481 |
| 2021/0381577 | A1* | 12/2021 | Ichikawa | F16F 13/10 |
| 2023/0407940 | A1* | 12/2023 | Hirano | F16F 9/535 |
| 2023/0415559 | A1* | 12/2023 | Hirano | F16F 13/305 |

\* cited by examiner

FLUID-FILLED VIBRATION DAMPING DEVICE

CROSS-REFERENCE TO RELATED APPLICATION

This application claims the priority benefit of Japan application serial no. 2022-033377, filed on Mar. 4, 2022. The entirety of the above-mentioned patent application is hereby incorporated by reference herein and made a part of this specification.

BACKGROUND

Technical Field

The disclosure relates to a vibration damping device suitable for an engine mount of an automotive, and particularly relates to a fluid-filled vibration damping device which exerts a vibration damping effect by using a flowing behavior of a fluid filled inside.

Description of Related Art

Conventionally, a fluid-filled vibration damping device used in an engine mount, a differential mount, etc., of an automotive, is known. German Patent Publication No. 102011117749 (Patent Document 1) discloses a fluid-filled vibration damping device having a configuration in which an inner member and an outer cylindrical member are elastically linked by a main rubber elastic body, multiple fluid chambers are provided inside, and an orifice path with which the fluid chambers communicate with each other. In addition, with the filled fluid flowing among the fluid chambers through the orifice path, the fluid-filled vibration damping device exerts a vibration damping effect based on the flowing behavior of the fluid.

Moreover, Patent Document 1 proposes to adopt, as the fluid filled into the fluid chambers, a magneto-rheological fluid whose rheological degree changes in accordance with the magnitude of an acting magnetic field. The fluid-filled vibration damping device of Patent Document 1 includes a magnetic unit forming a magnetic field by being supplied with power, and is able to change the flowing properties of the magneto-rheological fluid by applying the magnetic field generated by the magnetic unit to the magneto-rheological fluid. In addition, according to the fluid-filled vibration damping device of Patent Document 1, by controlling the magnitude of the magnetic field applied from the magnetic unit to the magneto-rheological fluid, the fluidity (rheological degree) of the magneto-rheological fluid is controlled. Since the properties such as damping or support rigidity are changed, excellent vibration damping performance or differential gear support performance can be realized.

PRIOR ART DOCUMENTS

Patent Documents

[Patent Document 1] German Patent Publication No. 102011117749

Nevertheless, when the magnetic unit shown in FIG. 4 of Patent Document 1 is to be arranged inside the fluid-filled vibration damping device, it is necessary to provide a liquid-tight seal structure so that the magnetic unit supplied with power does not contact the filled fluid, and the configuration may easily become complicated. Therefore, as shown in FIGS. 2 and 3 of Patent Document 1, the magnetic unit may be configured to be installed to the outer circumferential surface of the outer cylindrical member.

However, when the magnetic unit is installed to the outer circumferential surface of the outer cylindrical member, an outer mounting member realizing the linking between a vibration damping linking target member and the outer cylindrical member is arranged on a further outer circumference of the magnetic unit in the installation portion to the outer cylindrical member, and the increase in size of the installation portion to the outer cylindrical member tends to increase may easily become an issue.

SUMMARY

A fluid-filled vibration damping device includes: an inner member, an outer cylindrical member, and a main rubber elastic body, wherein the inner member and the outer cylindrical member are linked by the main rubber elastic body; multiple fluid chambers, provided inside the fluid-filled vibration damping device and filled with a magneto-rheological fluid; an orifice path, allowing the fluid chambers to communicate with each other; and a magnetic unit, applying a magnetic field to the magnetorheological fluid in the orifice path and provided in an externally fitting state with respect to the outer cylindrical member. The magnetic unit includes: a magnetic field generation part that forms a magnetic field by being supplied with power; and a magnetic path formation part that induces a magnetic flux of the magnetic field formed by the magnetic field generation part. A magnetic gap part provided in the magnetic path formation part is disposed on an outer circumference of the orifice path, and the magnetic field is applied from the magnetic gap part to the magnetorheological fluid in the orifice path. On an outer circumferential surface of the outer cylindrical member, an outer mounting member linking between the outer cylindrical member and a vibration damping linking target member is installed to an installation part, and the installation part is provided at a position offset from the magnetic field generation part in an axial direction.

DESCRIPTION OF THE EMBODIMENTS

Figure 1:
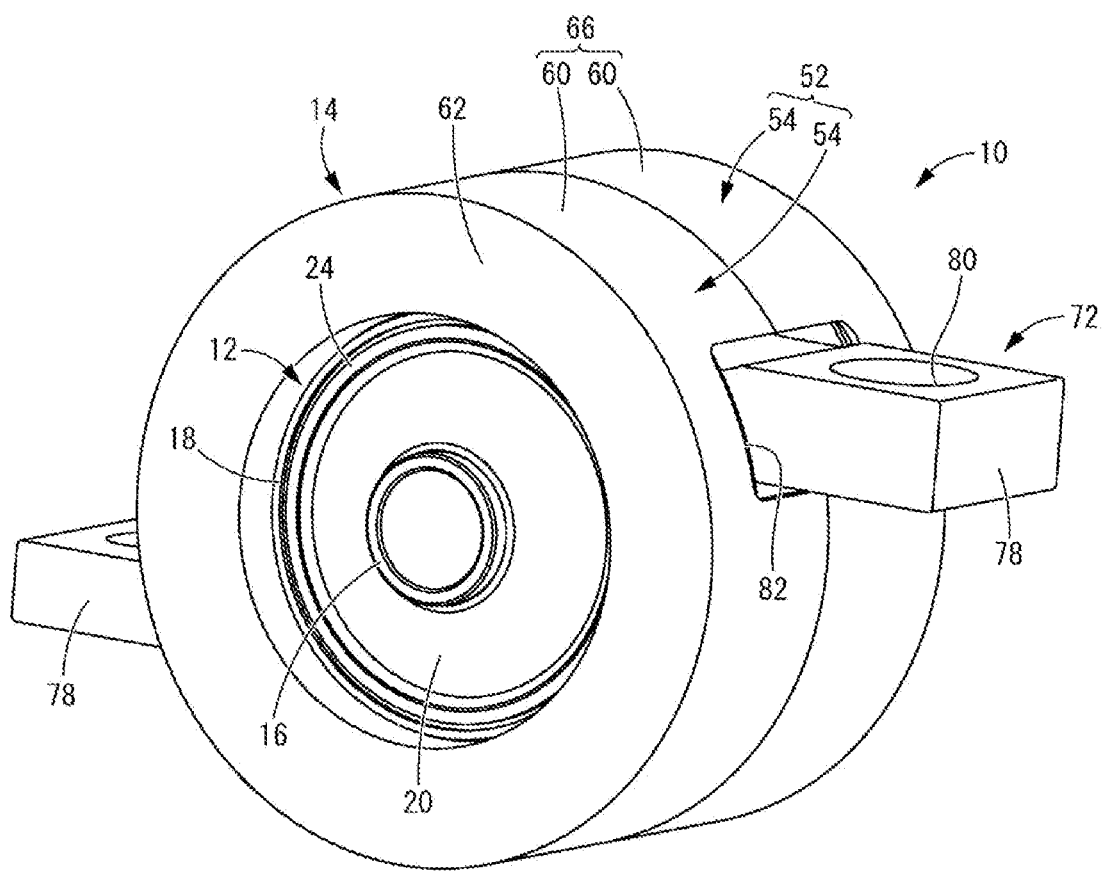
FIG. 1 is a perspective view illustrating an engine mount as a first embodiment of the disclosure.

The disclosure provides a fluid-filled vibration damping device with a novel configuration capable of controlling properties by applying a magnetic field to a magnetorheological fluid, while being capable of suppressing the increase in size of the outer mounting member linking the outer cylindrical member and the vibration damping linking target member.

Hereinafter, exemplary embodiments for understanding the disclosure will be described, but each embodiment described below is described as an exemplary example, and may be used in combination with each other as appropriate. Multiple components described in each aspect can also be recognized and adopted independently as much as possible, and can also be adopted in combination with any component described in another aspect as appropriate. Accordingly, the disclosure can be implemented in various alternatives without being limited to the embodiments described below.

A first aspect provides a fluid-filled vibration damping device, in which an inner member and an outer cylindrical member are linked by a main rubber elastic body, multiple fluid chambers filled with a magnetorheological fluid are provided inside, an orifice path allowing the fluid chambers to communicate with each other is provided, and a magnetic unit applying a magnetic field to the magnetorheological fluid in the orifice path is provided in an externally fitting state with respect to the outer cylindrical member. The magnetic unit includes: a magnetic field generation part that forms a magnetic field by being supplied with power; and a magnetic path formation part that induces a magnetic flux of the magnetic field formed by the magnetic field generation part. A magnetic gap part provided in the magnetic path formation part is disposed on an outer circumference of the orifice path, and the magnetic field is applied from the magnetic gap part to the magnetorheological fluid in the orifice path. On an outer circumferential surface of the outer cylindrical member, an outer mounting member linking between the outer cylindrical member and a vibration damping linking target member is installed to an installation part, and the installation part is provided at a position offset from the magnetic field generation part in an axial direction.

According to the fluid-filled vibration damping device configured in accordance with the aspect, by applying the magnetic field formed by the magnetic unit installed to the outer circumferential surface of the outer cylindrical member to the magnetorheological fluid filled in the fluid chambers, the vibration damping properties or vibration damping properties and properties such as the support rigidity of a power unit or a differential gear can be changed. In particular, by controlling the magnitude of the magnetic field applied by the magnetic unit to the magnetorheological fluid, the properties of the fluid-filled vibration damping device can be regulated and set, and excellent properties can be obtained. In addition, since the magnetic unit is installed to the outer circumferential surface of the outer cylindrical member, the magnetic unit does not contact the magnetorheological fluid filled into the fluid chambers, and the arrangement configuration is simplified.

The installation part of the outer cylindrical member to which the outer mounting member such as the installation bracket or the vibration damping linking target, etc., is installed is set to be offset from the magnetic field generation part, such as coil, that forms the magnetic unit in the axial direction. Accordingly, compared with the case where the outer mounting member is arranged on the outer circumference of the magnetic field generation part, the diameter of the installation portion of the outer mounting member to the outer cylindrical member can be reduced.

According to a second aspect, in the fluid-filled vibration damping device as set forth in the first aspect, the outer mounting member is an installation bracket linking the outer cylindrical member to the vibration damping linking target member, and the installation bracket installed to the outer cylindrical member penetrates through the magnetic path formation part.

According to the fluid-filled vibration damping device configured in accordance with the aspect, while the installation bracket is installed to the outer circumferential surface of the outer cylindrical member at a position offset from the magnetic field generation part in the axial direction, a large degree of freedom for the arrangement of the magnetic path formation part can be obtained.

According to a third aspect, in the fluid-filled vibration damping device as set forth in the second aspect, the magnetic path formation part comprises an inner circumferential magnetic path extending along an inner circumferential side of the magnetic field generation part in the axial direction, and an outer circumferential magnetic path extending along an outer circumferential side of the magnetic field generation part in the axial direction. In addition, the magnetic gap part of the magnetic path formation part is formed on the inner circumferential magnetic path of the magnetic path formation part, and the installation bracket penetrates through the outer circumferential magnetic path of the magnetic path formation part and protrudes toward an outer circumference.

According to the fluid-filled vibration damping device configured in accordance with the aspect, with the magnetic gap part formed in the inner circumferential magnetic path, the magnetic field can be efficiently applied from the magnetic gap part to the magnetorheological fluid filled into the inner circumferential side of the outer cylindrical member. In addition, with the installation bracket penetrating through the outer circumferential magnetic path, for example, a fastening portion of the installation bracket to the vibration damping linking target member can protrude toward the outer circumference from the magnetic path formation part.

According to a fourth aspect, in the fluid-filled vibration damping device as set forth in any of the first to third aspects, multiple magnetic field generation parts are arranged on two sides with respect to the installation part of the outer cylindrical member in the axial direction.

According to the fluid-filled vibration damping device configured in accordance with the aspect, by setting the installation position of the outer mounting member to the outer cylindrical member between the magnetic field generation parts in the axial direction, for example, it is easy to install the outer mounting member to a position close to the center in the axial direction with respect to the outer cylindrical member. In addition, by providing the magnetic field generation parts on the two sides of the installation position of the outer mounting member to the outer cylindrical member in the axial direction, the magnetic field generation parts can be arranged in excellent space efficiency, and it is possible to increase the degree of freedom for setting the magnetic field formed by the magnetic field generation parts.

According to a fifth aspect, in the fluid-filled vibration damping device as set forth in any of the first to fourth aspects, the magnetic path formation part is formed by two groove-shaped metal fittings that are in concave shapes open toward an inner side in the axial direction and face each other, the magnetic field generation part is arranged on an inner side of each of the groove-shaped metal fittings, and the magnetic gap part is provided between inner circumferential wall parts of the two groove-shaped metal fittings.

According to the fluid-filled vibration damping device configured in accordance with the aspect, the magnetic unit in which the magnetic path formation part is provided on the circumference of the magnetic field generation part can be easily obtained. In addition, by separating the inner circumferential sidewall parts of the two groove-shaped metal fittings facing each other from each other in the axial direction, the magnetic gap can be easily provided between the inner circumferential wall parts of the two groove-shaped metal fittings.

According to the disclosure, the fluid-filled vibration damping device is capable of controlling properties by applying a magnetic field to the magnetorheological fluid, while suppressing the increase in size of the installation portion of the outer mounting member to the outer cylindrical member, which links the outer cylindrical member and the vibration damping linking target member.

In the following, the embodiments of the disclosure are described with reference to the drawings.

Figure 2:
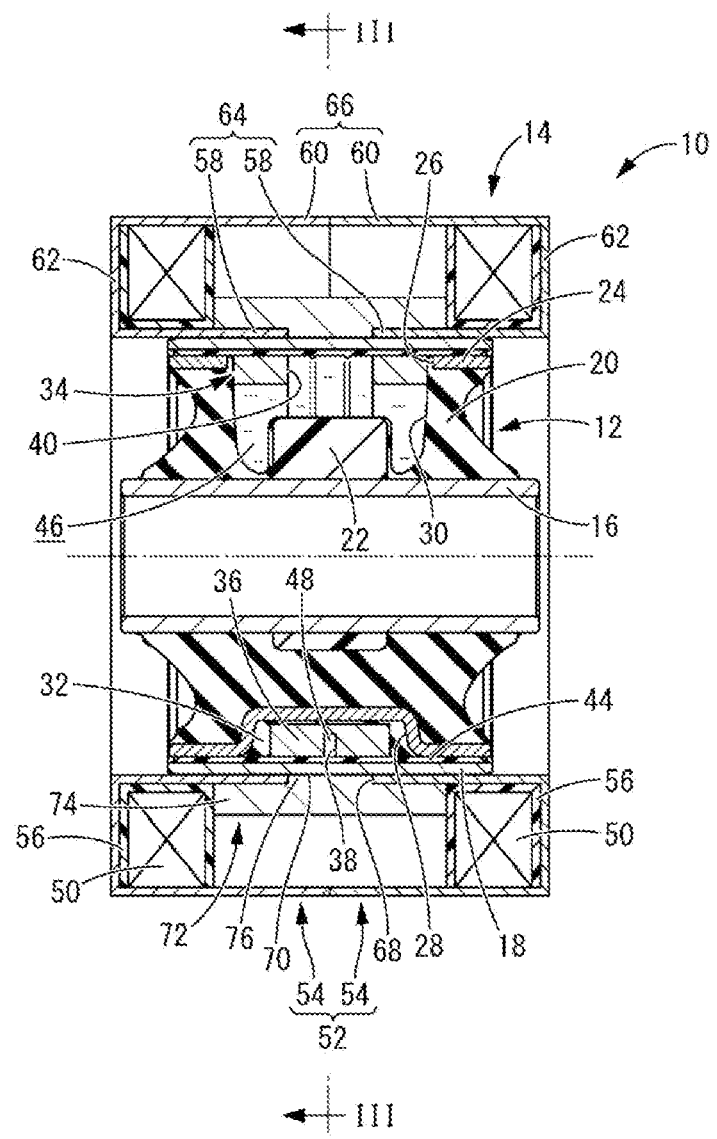
FIG. 2 is a cross-sectional view of the engine mount shown in FIG. 1, and is equivalent to a II-II cross-section of FIG. 3.
Figure 3:
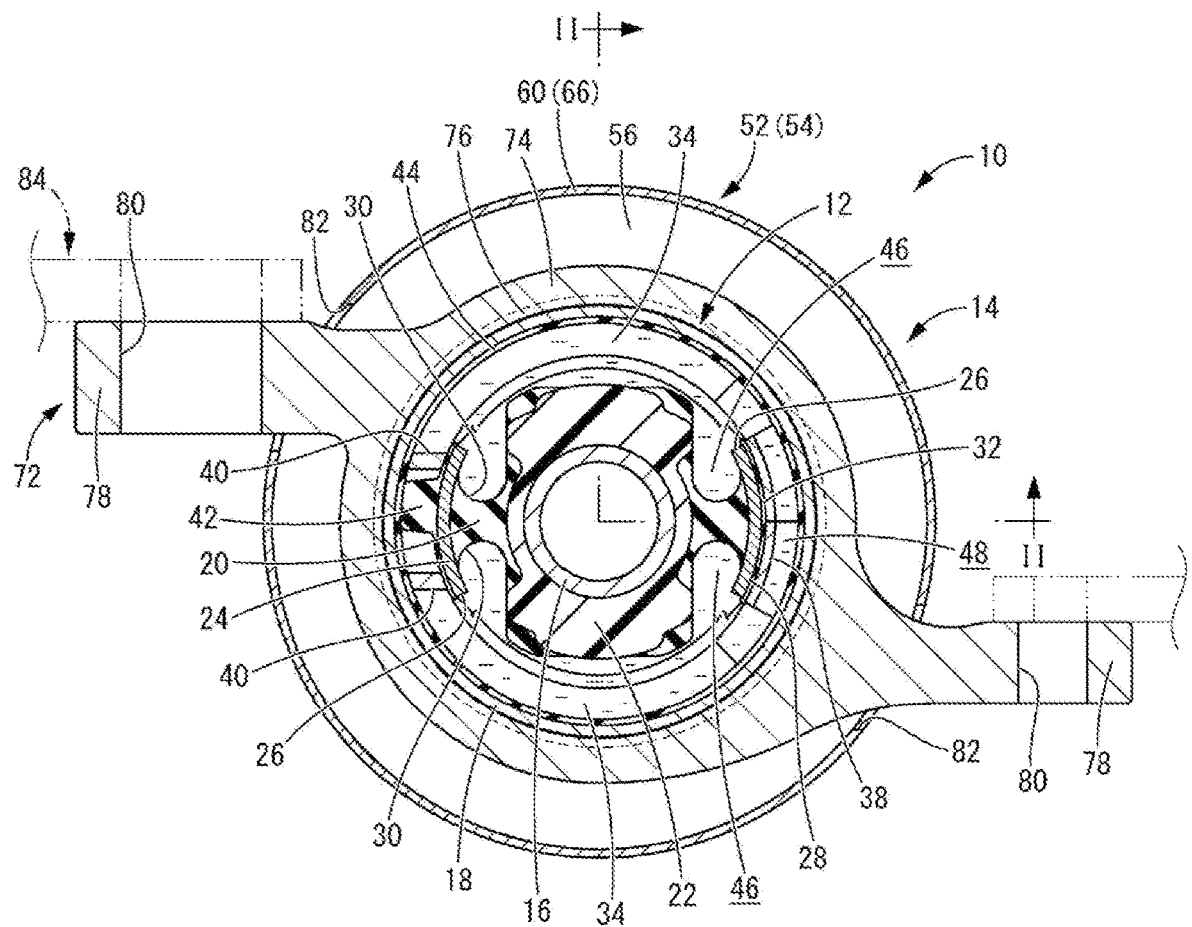
FIG. 3 is a cross-sectional view of III-III of FIG. 2.

In FIGS. 1 to 3, as a first embodiment of a fluid-filled vibration damping device configured according to the disclosure, an engine mount 10 of an automotive is shown. The engine mount 10 has a structure in which a magnetic unit 14 is installed to a mount body 12. The mount body 12 has a structure in which an inner member 16 and an outer cylindrical member 18 are linked by a main rubber elastic body 20. In the following descriptions, in principle, the upper-lower direction refers to the upper-lower direction in FIG. 2, the left-right direction refers to the left-right direction in FIG. 2, and the front-rear direction refers to the left-right direction in FIG. 1, which is an axial direction.

The inner member 16 is configured as a member of high rigidity formed in a substantially cylindrical shape that extends linearly by using metal, synthetic resin, etc. The inner member 16 may be formed by using a non-magnetic material such as stainless steel, synthetic resin, etc. A stopper member 22 is installed to the central portion of the inner member 16 in the axial direction. The stopper member 22 is provided in an externally fitting state with respect to the inner member 16, and protrudes toward two sides in the radial direction (upper-lower direction).

An intermediate sleeve 24 is arranged on the outer circumferential side of the inner member 16. The intermediate sleeve 24 is configured in a substantially cylindrical shape with a diameter greater than the inner member 16, and is arranged to be externally inserted to the inner member 16. The intermediate sleeve 24 may be formed by using a non-magnetic material such as stainless steel or synthetic resin. The central sleeve 24 includes a pair of window parts 26, 26 on two sides (the upper-lower direction in FIG. 2) in a direction of the radial direction. The window part 26 extends in the circumferential direction with a length less than a half of the circumference, and penetrates through the intermediate sleeve 24 in the upper-lower direction. Groove-shaped parts 28, 28 are formed between the window parts 26, 26 in the intermediate sleeve 24 in the circumferential direction. The groove-shaped part 28 is located at the central portion of the intermediate sleeve 24 in the axial direction, and is provided to extend in the circumferential direction as a concave cross-section open to the outer circumferential surface.

The inner member 16 and the intermediate sleeve 24 are elastically linked by the main rubber elastic body 20. The main rubber elastic body 20 in its entirety is in a thick, substantially cylindrical shape, the inner circumferential surface of the main rubber elastic body 20 is fixed to the inner member 16, and the outer circumferential surface of the main rubber elastic body 20 is fixed to the outer cylindrical member 18. The main rubber elastic body 20 of the embodiment is formed as an integrally vulcanized molded article including the inner member 16 and the intermediate sleeve 24, and the inner member 16 and the intermediate sleeve 24 are vulcanized and bonded to the main rubber elastic body 20. In addition, by reducing the diameter of the intermediate sleeve 24 in the radial direction by performing a diameter reduction process such as eight-way squeezing, etc., after the main rubber elastic body 20 is molded, the tensile strain due to cooling shrinkage after the main rubber elastic body 20 is molded can be reduced.

The main rubber elastic body 20 includes a pair of pocket parts 30, 30 open on two sides in a direction (the upper-lower direction in FIG. 2) of the radial direction. The pocket part 30 has an opening shape corresponding to the window part 26, an opening circumferential part is fixed to the intermediate sleeve 24, and the pocket part 30 is open to the outer circumference via the window part 26 in the integrally vulcanized molded article of the main rubber elastic body 20. The stopper member 22 installed to the inner member 16 protrudes, in the radial direction, from the inner circumferential side toward the outer circumferential side and into each pocket part 30.

Figure 4:
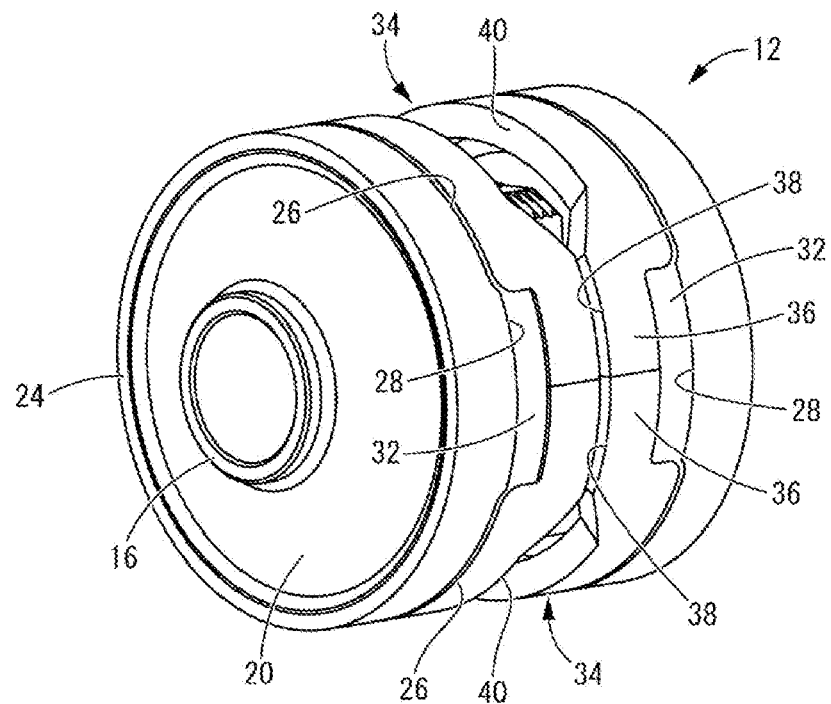
FIG. 4 is a perspective view illustrating a state in which an orifice member is installed to an integrally vulcanized molded article of a main rubber elastic body forming the engine mount of FIG. 1.
Figure 5:
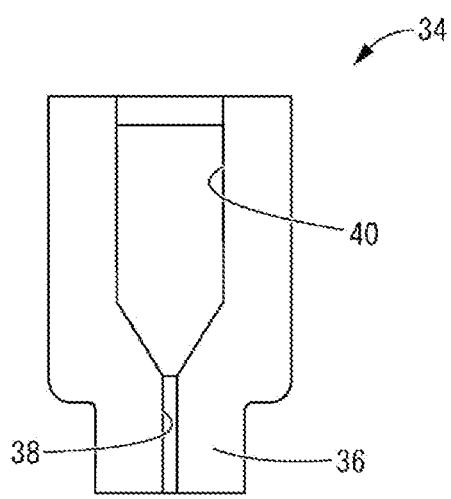
FIG. 5 is a front view of an orifice member forming the engine mount of FIG. 1.

The inner surfaces of the groove-shaped parts 28, 28 of the intermediate sleeve 24 are respectively covered by a fitting rubber 32 integrally formed with the main rubber elastic body 20. In addition, as shown in FIG. 4, orifice members 34, 34 are installed to the groove-shaped parts 28, 28. The orifice member 34 is configured in a substantially semi-cylindrical shape extending in the circumferential direction with a length less than a half of the circumference and arranged to straddle the window part 26 in the circumferential direction, and two ends of the orifice member 34 in the circumferential direction are inserted into the groove-shaped parts 28, 28. An end of the orifice member 34 in the circumferential direction is configured as a narrow width part 36 whose axial direction dimension is less than other portions. As shown in FIG. 5, in the narrow width part 36 of the orifice member 34, a groove 38 open to the outer circumferential surface and extending in the circumferential direction is formed in the central portion of the axial direction. In addition, in another portion of the orifice member 34 outside the narrow width part 36 in the circumferential direction, an opening part 40 having an axial direction dimension greater than the groove 38 and penetrating through in the radial direction is provided. In the opening part 40, the width of the end on the side of the groove 38 in the circumferential direction is gradually reduced in the axial direction toward the groove 38, and the groove 38 and the opening 40 are continuous in the circumferential direction. The orifice member 34 is formed by a ferromagnetic material such as iron, nickel, chromium, soft ferrite, etc.

The two orifice members 34, 34 are arranged to face each other in the radial direction, and are installed to the intermediate sleeve 24 in a state in which the narrow width parts 36, 36 are inserted from two sides in the circumferential direction into one of the groove-shaped parts 28. The ends of the two orifice members 34, 34 in the circumferential direction on the side opposite to the narrow width parts 36, 36 are inserted into the other groove part 28 from two sides in the circumferential direction, and a partition rubber 42 protruding from the fitting rubber 32 toward the outer circumference is arranged between the ends in the circumferential direction on the side opposite to the narrow width parts 36, 36. With the two ends of each of the orifice members 34, 34 in the circumferential direction being inserted into the groove-shaped parts 28, 28, each of the orifice members 34, 34 is arranged to straddle each of the window parts 26, 26 in the circumferential direction, and the opening part 40 is in communication with the pocket part 30 through the window part 26.

The outer cylindrical member 18 is installed to the integrally vulcanized molded article of the main rubber elastic body 20. The outer cylindrical member 18 is configured in a substantially cylindrical shape with a diameter greater than the intermediate sleeve 24, and may be formed by using a non-magnetic material such as stainless steel or synthetic resin. In the outer cylindrical member 18, the inner circumferential surface is covered by a seal rubber layer 44. By performing a diameter reduction process on the outer cylindrical member 18 in a state of being externally inserted to the intermediate sleeve 24 to which the orifice members 34, 34 are mounted, the inner circumferential surface of the outer cylindrical member 18 covered by the seal rubber layer 44 is pressed against the outer circumferential surface of the intermediate sleeve 24, and the outer cylindrical member 18 is fixed to the intermediate sleeve 24. Since the seal rubber layer 44 is arranged in a compressed state, the overlapping surfaces of the outer cylindrical member 18 and the intermediate sleeve 24 are sealed in a liquid-tight manner. It is noted that the overlapping surfaces between the outer cylindrical member 18 and the orifice members 34, 34 may also be filled in a liquid-tight manner by using the seal rubber layer 44.

The window parts 26, 26 are covered by the outer cylindrical member 18, and the outer circumferential openings of the pocket parts 30, 30 are blocked in a liquid-tight manner by the outer cylindrical member 18. Accordingly, two fluid chambers 46, 46 are formed inside the engine mount 10. A magnetorheological fluid is filled into each fluid chamber 46. The magnetorheological fluid is a fluid whose rheological degree is increased through acting of a magnetic field. The magnetic functional liquid may be any of a magneto-rheological fluid (MRF), a magnetic fluid (MF), a magnetic composite fluid (MCF) mixing MRF and MF. As the magnetorheological fluid, an MRF whose rheological degree changes significantly with respect to the acting of a magnetic field may be adopted, and an MCF whose magnitude of increase in the rheological degree can be easily adjusted according to the mixing ratio between MRF and MF may also be adopted as appropriate.

The magnetorheological fluid, for example, is a suspension or a colloidal solution in which ferromagnetic fine particles are dispersed in a base liquid such as water, oil, etc. The surfaces of the ferromagnetic fine particles are coated with a surfactant, or the ferromagnetic fine particles are dispersed in a base liquid with addition of a surfactant, so that it is difficult for the ferromagnetic fine particles to aggregate or to deposit in the base liquid.

The ferromagnetic fine particles are, for example, metal particles of iron, ferrite, magnetite, etc., and the particle diameter may range, for example, between about 8 nm and about 10 μm. The base liquid is not particularly limited, as long as the ferromagnetic fine particles can be dispersed. For example, water, isoparaffin, alkylnaphthalene, perfluoropolyether, polyolefin, silicone oil, etc., may be adopted. In addition, the base liquid may be a non-compressible fluid. The surfactant may be selected as appropriate in accordance with the base liquid, for example, oleic acid, etc., may be adopted as appropriate. MRF and MF mainly differ in the particle diameter of the ferromagnetic fine particles. The particle diameter of the ferromagnetic fine particles in MRF is greater than that of MF.

The fluid chambers 46 and 46 are in communication with each other by an orifice path 48. The orifice path 48 is formed by covering and blocking the outer circumferential openings of the grooves 38, 38 of the orifice members 34, 34 by using the outer cylindrical member 18. The orifice path 48 extends in the circumferential direction between the fluid chambers 48, 48 in the circumferential direction, and two ends of the orifice path 48 in the circumferential direction are in communication with the fluid chambers 46, 46. By setting a ratio between path cross-section and path length while considering the wall spring rigidity of the fluid chambers 46, 46 and the rheological degree of the magnetorheological fluid, the tuning frequency, which is the resonance frequency of the flowing fluid, is set as appropriate in accordance with the vibration frequency of the vibration damping target.

It is noted that, the orifice path 48 of the embodiment is provided between the fluid chambers 46, 46 in the circumferential direction. However, the orifice path, for example, may also be provided to extend the opening of the pocket 30 in the circumferential direction. By doing so, a greater path length can be ensured. The path with such length is realized by, for example, forming the groove 38 in a longer range in the circumferential direction in the orifice member 34, and reducing the length of the opening part 40 in the circumferential direction.

The magnetic unit 14 is installed to the mount body 12. The magnetic unit 14 includes coils 50 as a magnetic field generation part and a yoke 52 as a magnetic path formation part. More specifically, the magnetic unit 14 of the embodiment has a structure in which two coils 50, 50 are disposed on the inner sides of two groove-shaped metal fittings 54, 54, and the two groove-shaped metal fittings 54, 54 face each other to open toward the inner side in the axial direction.

The coil 50 is formed by a conductive metal wire member, and is wound around a non-magnetic bobbin 56. The coil 50 is connected to an external power supply device via a connector provided in the bobbin 56 and not shown herein. By supplying power to the coil 50, a magnetic field is formed around the coil 50.

The groove-shaped metal fitting 54 is annular and continuous in the circumferential direction and has a cross-sectional shape of a concave groove open to the inner side in the axial direction, and has a configuration in which each cylindrical inner circumferential wall part 58 and outer circumferential wall part 60 are connected by a bottom wall part 62 at an outer end in the axial direction. The groove-shaped metal fitting 54 is formed by a ferromagnetic material such as iron, nickel, chromium, soft ferrite, etc. The coil 50 arranged between the inner wall part 58 and the outer wall part 60 in the groove-shaped metal fitting 54 is superimposed on the bottom wall part 62 of the groove-shaped metal fitting 54 from the inner side in the axial direction.

The two groove-shaped metal fittings 54, 54 in each of which the coil 50 is arranged on the inner side face each other in the axial direction, the outer circumferential wall parts 60, 60 abut against each other in the axial direction, and the inner circumferential wall parts 58, 58 are separated from each other in the axial direction. In this way, by arranging the two groove-shaped metal fittings 54, 54 to face each other, the yoke 52 is formed by the groove-shaped metal fittings 54, 54. In the embodiment, an inner circumferential magnetic path 64 of the yoke 52 is formed by the inner circumferential wall parts 58, 58 of the groove-shaped metal fittings 54, and an outer circumferential magnetic path 66 of the yoke 52 is formed by the outer circumferential wall parts 60, 60 of the groove-shaped metal fittings 54. The coil 50 is arranged on the inner side of the groove-shaped metal fitting 54, the inner circumferential magnetic path 64 is provided to extend in the axial direction on the inner circumferential side of the coil 50, and the outer circumferential magnetic path 66 is provided to extend in the axial direction on the outer circumferential side of the coil 50. In the inner circumferential magnetic path 64 of the yoke 52, a magnetic gap part 68 is formed between the inner circumferential wall part 58, 58 in the axial direction. In addition, the magnetic flux of the magnetic field formed on the circumference of the coil 50 by supplying power to the coil 50 is induced by the yoke 52, and the magnetic field is efficiently applied to the outside at the magnetic gap part 68. Although the outer circumferential wall parts 60, 60 abut against each other in the axial direction in the embodiment, for example, the outer circumferential wall parts 60, 60 may also be separated from each other by a separation distance shorter than the magnetic gap part 68.

The magnetic unit 14 is installed to the outer circumferential surface of the outer cylindrical member 18. That is, by externally fitting the inner circumferential magnetic path 64 of the yoke 52 to the outer circumferential surface of the outer cylindrical member 18, the magnetic unit 14 is fixed to the outer cylindrical member 18 in an externally fitting state. In the state in which the magnetic unit 14 is fixed to the outer cylindrical member 18, the coils 50, 50 are disposed on the outer circumference of the two ends of the outer cylindrical member 18 in the axial direction. In the embodiment, the coils 50, 50 are disposed to protrude on the outer side in the axial direction from the outer cylindrical member 18. In addition, the magnetic gap part 68 of the yoke 52 is located at the central portion of the outer cylindrical member 18 in the axial direction, and is disposed on the outer circumference of the orifice path 48. In brief, the magnetic gap part 68 and the orifice path 48 are aligned with each other in the axial direction. In addition, by arranging the magnetic gap part 68 in the vicinity of the orifice path 48, the magnetic field generated by the coils 50, 50 is guided by the yoke 52 and applied to the magnetorheological fluid inside the orifice path 48 from the magnetic gap part 68. In addition, the magnetic gap part 68 is provided at a position on the inner side in the axial direction and away from the coils 50, 50. The outer circumferential surface of the outer cylindrical member 18 is overlapped with the inner circumferential magnetic path 64, and is exposed to the outer circumference at the magnetic gap part 68. The exposed portion is set as an installation part 70. The installation part 70 is arranged at a position apart from the coils 50, 50 in the axial direction, and is arranged between the coils 50, 50 in the axial direction. That is, on the outer circumferential surface of the outer cylindrical member 18, the coils 50 are installed on the two sides apart from the installation part 70 in the axial direction.

At the position apart from the coils 50, 50 of the magnetic unit 14 in the axial direction, an installation bracket 72, as an outer mounting member, is installed to the outer circumferential surface of the outer cylindrical member 18. As shown in FIG. 3, the installation bracket 72 includes an installation cylindrical part 74 arranged in a substantially cylindrical shape and externally fit and fixed to the outer circumferential surface of the outer cylindrical member 18. In the installation cylindrical part 74, the inner circumferential surface at the central part in the axial direction has a diameter smaller than the inner circumferential surfaces at the two ends, and a fitting protrusion part 76 protruding toward the inner circumference is provided at the central part in the axial direction. The installation cylindrical part 74 is arranged between the coils 50, 50 in the axial direction, and, at a position apart from the coils 50, 50 in the axial direction, the fitting protrusion part 76 is fit and fixed to the installation part 70 of the outer circumference surface of the outer cylindrical member 18.

Accordingly, since the installation bracket 72 is installed to the outer circumferential surface of the outer cylindrical member 18 at the position at which the installation cylindrical part 74 is apart from the coils 50, 50 of the magnetic unit 14 in the axial direction, the diameter of the installation cylindrical part 74 is smaller than a configuration in which the installation bracket 72 is arranged on the outer circumferential sides of the coils 50, 50, and the increase in size of the installation bracket 72 can be avoided.

As shown in FIG. 2, gaps are formed between the installation cylindrical part 74 and the outer cylindrical member 18 on the two sides of the fitting protrusion part 76 in the axial direction, and the inner circumferential wall parts 58, 58 of the magnetic unit 14 are inserted into the gaps. In other words, the installation bracket 72 is installed to the outer cylindrical member 18 by making the fitting protrusion part 76 of the installation cylindrical part 74 penetrate through the magnetic gap part 68 of the yoke 52 and fitting the fitting protrusion part 76 to the installation part 70 of the outer circumferential surface of the outer cylindrical member 18. The installation bracket 72 is formed by a non-magnetic material, such as stainless steel or synthetic resin, and even if the installation bracket 72 is arranged close to the magnetic gap 68, it is difficult for the magnetic flux to escape from the yoke 52 to the installation bracket 72.

The installation bracket 72, as shown in FIG. 3, includes two fastening pieces 78, 78 protruding from the installation cylindrical part 72 toward the outer circumferential side. The fastening piece 78 is in a substantially rectangular plate shape, and includes a bolt hole 80 penetrating through the thickness direction. The two fastening pieces 78, 78 protrude from the installation cylindrical part 74 toward the two sides in the left-right direction. The two fastening pieces 78, 78 are both apart from the center of the installation cylindrical part 74 in the upper-lower direction, and are provided at positions deviated from each other in the upper-lower direction. As shown in FIGS. 1 and 3, the fastening pieces 78, 78 protrude from the magnetic unit 14 toward the outer circumference through insertion windows 82, 82 penetrating through the outer magnetic path 66 of the yoke 52.

In this way, by configuring the fastening pieces 78, 78 of the installation bracket 72 to penetrate through the outer magnetic path 66 of the yoke 52 and protrude toward the outer circumference, the configuration of the yoke 52 can be prevented from being limited by the installation configuration (installation position) of the installation bracket 72 to the vehicle, and the installation configuration (installation position) of the installation bracket 72 to the vehicle can be prevented from being limited by the configuration of the yoke 52, and a high design freedom degree can be realized.

The engine mount 10 so configured, for example, is installed to the power unit side, which is a vibration damping linking target member, by an inner bolt (not shown) through which the inner member 16 is inserted. In addition, by bolt-fixing the two fastening pieces 78, 78 to the side of a vehicle body 84, which is another vibration damping linking target, the outer cylindrical member 18 is installed to the side of the vehicle body 84 via the installation bracket 72. Accordingly, the power unit (not shown) is supported by the vehicle body 84 with vibration damping through the engine mount 10.

In the vehicle mounting state as described above, when vibration is input between the inner member 16 and the outer cylindrical member 18 of the engine mount 10 to cause a relative pressure change between the fluid chambers 46, 46, a fluid flow through the orifice path 48 is generated between the fluid chambers 46, 46. In particular, in the case where the frequency of the input vibration and the tuning frequency of the orifice path 48 are equal, a fluid flow is actively generated in a resonance state in the orifice path 48, and a vibration damping effect is exerted based on the flowing behavior of the fluid.

In the engine mount 10, by applying a magnetic field whose magnitude corresponds to the input vibration to the magnetorheological fluid in the orifice path 48, it is possible to change the setting of the tuning frequency of the orifice path 48. That is, in the magnetorheological fluid, the rheological degree increases in accordance with the magnitude (magnetic flux density) of the applied magnetic field. In other words, by controlling the power supplied to the coil 50, the magnitude of the magnetic field is controlled, and the rheological degree of the magnetorheological fluid can be regulated. Accordingly, by controlling the magnitude of the magnetic field applied to the magnetorheological fluid in the orifice path 48, even if the path cross-sectional area and the path length of the orifice path 48 remain constant, the tuning frequency of the orifice path 48 can be changed. Therefore, effective vibration damping properties can be obtained against vibration of a wider frequency range.

In the embodiment, the magnetic gap part 68 is provided in the inner circumferential magnetic path 64 of the yoke 52 guiding the magnetic flux, and the magnetic gap part 68 is aligned with the orifice path 48 in the axial direction. Accordingly, when power is supplied to the coil 50, the magnetic field is efficiently applied from the magnetic poles formed on the two sides of the magnetic gap part 68 to the magnetorheological fluid in the orifice path 48, and the change of the setting of the properties can be effectively realized. Since the inner circumferential magnetic path 64 in which the magnetic gap part 68 is provided extends in the axial direction from the inner circumferential ends of the bottom wall parts 62, 62, the degree of freedom for setting the position of the magnetic gap part 68 in the inner circumferential magnetic path 64 in the axial direction is large, and the position of the end of the inner circumferential magnetic path 64 where the magnetic pole is formed on the side of the magnetic gap part 68 with respect to the position of the orifice path 48 in the axial direction can be set with a large degree of freedom. Accordingly, for example, the end of the inner circumferential magnetic path 64 where the magnetic pole is formed can be arranged to be very close to the orifice member 34, and the magnetic flux can efficiently pass through from the orifice member 34 to the orifice path 48.

Figure 6:
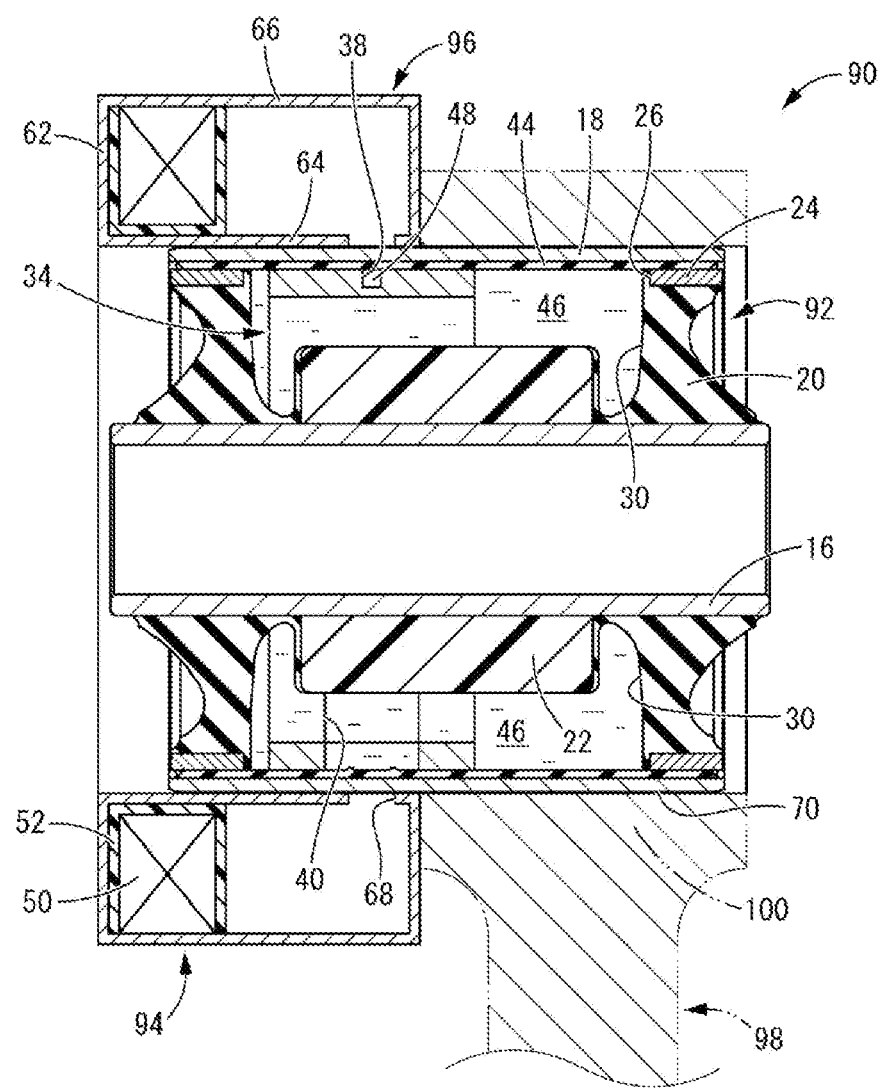
FIG. 6 is a cross-sectional view illustrating an engine mount as a second embodiment of the disclosure.

In FIG. 6, as a second embodiment of a fluid-filled vibration damping device configured according to the disclosure, a suspension bushing 90 of an automotive is shown. The suspension bushing 90 has a configuration in which a magnetic unit 94 is installed to a bushing body 92. Like the engine mount 10 of the first embodiment, by controlling the magnetic field applied from the magnetic unit 94 to the magnetorheological fluid in an orifice 48, it is possible to change properties such as vibration damping properties or support rigidity. In the following, components substantially the same as those of the first embodiment are labeled with the same reference symbols, and the descriptions thereof may be omitted.

In the bushing body 92, the orifice member 34 is arranged to be offset toward a side (the left side in FIG. 6) in the axial direction with respect to the center of the outer cylindrical member 18 in the axial direction, and the orifice path 48 is provided at a position apart from the center of the outer cylindrical member 18 in the axial direction and offset to a side in the axial direction.

The magnetic unit 94 has a configuration in which one coil 50 is arranged inside a yoke 96 having a space in a substantially rectangular cross-sectional shape. The coil 50 is arranged on the outer circumference of an end of the outer cylindrical member 18 in the axial direction. The magnetic unit 94 is arranged on a side in the axial direction with respect to the center of the outer cylindrical member 18 in the axial direction, and the other side (the right side in FIG. 6) in the axial direction with respect to the center of the outer cylindrical member 18 in the axial direction protrudes toward the other side in the axial direction with respect to the magnetic unit 94. In the magnetic unit 94, the magnetic gap part 68 is provided at a position deviated to the other side in the axial direction with respect to the center of the inner circumferential magnetic path 64 in the axial direction, aligned with the orifice path 48 in the axial direction, and is disposed on the outer circumferential side of the orifice path 48. It is noted that, the magnetic gap parts 68 are provided at positions deviated toward the other side in the axial direction with respect to the coils 50, 50.

Even if the orifice path 48 is apart from the center of the outer cylindrical member 18 in the axial direction, the magnetic gap part 68 is arranged at a position apart from the center of the outer cylindrical member 18 in the axial direction, and the orifice path 48 and the magnetic gap part 68 are aligned in the axial direction. Therefore, a magnetic field generated by supplying power to the coil 50 can be efficiently applied to the magnetorheological fluid in the orifice path 48. Like the first embodiment, the magnetic gap part 68 is provided in the middle of the inner circumferential magnetic path 64 extending in the axial direction, and the degree of freedom for setting the position in the axial direction is large. Therefore, the magnetic gap part 68 can be aligned with the orifice path 48, and the magnetic field can function effectively in the magnetorheological fluid in the orifice path 48. In particular, in the embodiment, the yoke 96 can extend toward the other side (the side of a link arm 98 to be described afterwards) from the coil 50. Accordingly, the position and the size of the magnetic gap part 68 in the yoke 96 are not limited by the arrangement of the coil 50, and can be set with a large degree of freedom. As a result, for example, the magnetic gap part 68 corresponding to the position or the width dimension of the orifice path 48 in the axial direction is set easily, and the design freedom degree is increased.

The link arm 98, as the vibration damping linking target member, is installed to the outer cylindrical member 18 protruding toward the other side in the axial direction from the magnetic unit 94. The link arm 98 includes a cylindrical mounting part 100 at an end, and the cylindrical mounting part 100 is installed to the outer circumferential surface of the outer cylindrical member 18. In brief, in the embodiment, the magnetic unit 94 is installed to substantially a half of the outer cylindrical member 18 in the axial direction, and the link arm 98 is installed to substantially the other half of the outer cylindrical member 18 in the axial direction. The cylindrical mounting part 100 of the link arm 98 is installed to the outer cylindrical member 18 at a position apart from the magnetic unit 94 in the axial direction. Therefore, compared with the case of being arranged on the outer circumference of the magnetic unit 94, the diameter of the cylindrical mounting part 100 can be reduced.

In this way, the outer mounting member installed to the outer circumferential surface of the outer cylindrical member is not necessarily limited to a member interposed between the vibration damping linking target member (vehicle body 84) and the outer cylindrical member 18 like the installation bracket 72 of the above embodiment, but may also be configured by using a portion of the vibration damping linking target member (link arm 98). In this case, by directly installing the vibration damping linking target member to the installation part 70 of the outer cylindrical member 18 without another member being interposed, the linking between the outer cylindrical member 18 and the vibration damping linking target member is realized. In addition, in the first embodiment, the installation bracket 72 is arranged at the central portion of the magnetic unit 14 including the yoke 52 in the axial direction, and penetrates through a portion of the yoke 52. However, the installation bracket or the vibration damping linking target member installed to the outer circumferential surface of the outer cylindrical member 18 may also be disposed to be apart from or adjacent to the magnet unit in the axial direction. In the embodiment, the link arm 98 including the cylindrical installation part 100 is formed by using a non-magnetic material. Even if the link arm 98 is arranged to be adjacent to the yoke 96 in the axial direction, it is still difficult for the magnetic flux guided by the yoke 96 to escape to the link arm 98. It is noted that, in the case where the yoke 96 and the link arm 98 are arranged to be sufficiently apart from each other, etc., the link arm 98 can also be formed by using a magnetic material.

In a configuration in which the magnetic unit 94 is installed to a portion of the outer cylindrical member 18 in the axial direction and the outer mounting member is installed to another portion of the outer cylindrical member 18 in the axial direction that protruding from the magnetic unit 94 in the axial direction, such as the suspension bushing 90 according to the embodiment, the outer mounting member may also be an installation bracket, instead of the vibration damping linking target member (the link arm 98), and the outer cylindrical member 18 can also be linked to the vibration damping linking target member, such as the link arm, etc., via the installation bracket.

Although the embodiments of the disclosure have been described above in detail, the disclosure is not limited to such detailed description. For example, the number of the coils 50 of the magnetic unit 14 may be three or more. For example, by arranging two coils 50 in the state of being wound around the bobbin 56 on each of the two sides of the installation cylindrical member 74 of the installation bracket 72 in the axial direction, it is possible to regulate the total number of turns of the coils 50 through the standardized combination of the coils 50 and regulate the maximum magnitude, etc., of the magnetic field formed by the coils 50.

The arrangement of the fastening pieces 78, 78 shown in the first embodiment is merely an example, and may be changed as appropriate. Specifically, for example, the two fastening pieces may extend toward the same side in the left-right direction, and may also extend in radial directions orthogonal to each other. In addition, there may be only one fastening piece, and may be three or more fastening pieces. Moreover, the installation portion of the installation bracket to the vibration damping linking target member is not necessarily limited to be plate-shaped like the fastening piece 78, but may also be block-shaped, column-shaped, cylinder-shaped, etc., and a fastening bolt may also be implanted in the installation cylindrical part 74.

In the embodiments, a cylindrical vibration damping device is shown as the fluid-filled vibration damping device according to the disclosure. However, for example, the configuration of the disclosure can also be applied to a so-called bowl-shaped vibration damping device in which the inner member is arranged on a side of the outer cylindrical member in the axial direction, and multiple fluid chambers are arranged side-by-side in the axial direction on the other side of the inner member in the axial direction.

In the first embodiment, the engine mount 10 is shown, and in the second embodiment, the suspension bushing 90 is shown. However, the fluid-filled vibration damping device according to the embodiment can be applied within the same scope as the conventional fluid-filled vibration damping device, such as being applied to a differential mount.

What is claimed is:

1. A fluid-filled vibration damping device, comprising:
an inner member, an outer cylindrical member, and a main rubber elastic body, wherein the inner member and the outer cylindrical member are linked by the main rubber elastic body;
a plurality of fluid chambers, provided inside the fluid-filled vibration damping device and filled with a magnetorheological fluid;
an orifice path, allowing the fluid chambers to communicate with each other; and
a magnetic unit, applying a magnetic field to the magnetorheological fluid in the orifice path and provided in an externally fitting state with respect to the outer cylindrical member,
wherein the magnetic unit comprises: a magnetic field generation part that forms a magnetic field by being supplied with power; and a magnetic path formation part that induces a magnetic flux of the magnetic field formed by the magnetic field generation part,
a magnetic gap part provided in the magnetic path formation part is disposed on an outer circumference of the orifice path, and the magnetic field is applied from the magnetic gap part to the magnetorheological fluid in the orifice path, and
on an outer circumferential surface of the outer cylindrical member, an outer mounting member linking between the outer cylindrical member and a vibration damping linking target member is installed to an installation part, and the installation part is provided at a position offset from the magnetic field generation part in an axial direction,
wherein the outer mounting member is an installation bracket linking the outer cylindrical member to the vibration damping linking target member, and
the installation bracket installed to the outer cylindrical member penetrates through the magnetic path formation part.

2. The fluid-filled vibration damping device as claimed in claim 1, wherein the magnetic path formation part comprises an inner circumferential magnetic path extending along an inner circumferential side of the magnetic field generation part in the axial direction, and an outer circumferential magnetic path extending along an outer circumferential side of the magnetic field generation part in the axial direction,
the magnetic gap part of the magnetic path formation part is formed on the inner circumferential magnetic path of the magnetic path formation part, and
the installation bracket penetrates through the outer circumferential magnetic path of the magnetic path formation part and protrudes toward an outer circumference.

3. The fluid-filled vibration damping device as claimed in claim 2, wherein a plurality of magnetic field generation parts are arranged on two sides with respect to the installation part of the outer cylindrical member in the axial direction.

4. The fluid-filled vibration damping device as claimed in claim 2, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and
  the magnetic gap part is provided between inner circumferential wall parts of the two groove-shaped metal fittings.

5. The fluid-filled vibration damping device as claimed in claim 1, wherein a plurality of magnetic field generation parts are arranged on two sides with respect to the installation part of the outer cylindrical member in the axial direction.

6. The fluid-filled vibration damping device as claimed in claim 1, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and
  the magnetic gap part is provided between inner circumferential wall parts of the two groove-shaped metal fittings.

7. The fluid-filled vibration damping device as claimed in claim 1, wherein a plurality of magnetic field generation parts are arranged on two sides with respect to the installation part of the outer cylindrical member in the axial direction.

8. The fluid-filled vibration damping device as claimed in claim 7, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and
the magnetic gap part is provided between inner circumferential wall parts of the two groove-shaped metal fittings.

9. The fluid-filled vibration damping device as claimed in claim 1, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and
  the magnetic gap part is provided between inner circumferential wall parts of the two groove-shaped metal fittings.

10. A fluid-filled vibration damping device, comprising:
  an inner member, an outer cylindrical member, and a main rubber elastic body, wherein the inner member and the outer cylindrical member are linked by the main rubber elastic body;
  a plurality of fluid chambers, provided inside the fluid-filled vibration damping device and filled with a magnetorheological fluid;
  an orifice path, allowing the fluid chambers to communicate with each other; and
  a magnetic unit, applying a magnetic field to the magnetorheological fluid in the orifice path and provided in an externally fitting state with respect to the outer cylindrical member,
  wherein the magnetic unit comprises: a magnetic field generation part that forms a magnetic field by being supplied with power; and a magnetic path formation part that induces a magnetic flux of the magnetic field formed by the magnetic field generation part,
  a magnetic gap part provided in the magnetic path formation part is disposed on an outer circumference of the orifice path, and the magnetic field is applied from the magnetic gap part to the magnetorheological fluid in the orifice path, and
  on an outer circumferential surface of the outer cylindrical member, an outer mounting member linking between the outer cylindrical member and a vibration damping linking target member is installed to an installation part, and the installation part is provided at a position offset from the magnetic field generation part in an axial direction,
  wherein the magnetic path formation part comprises an inner circumferential magnetic path, and the inner circumferential magnetic path is externally fitted to the outer circumferential surface of the outer cylindrical member.

11. The fluid-filled vibration damping device as claimed in claim 10, wherein the outer mounting member is an installation bracket linking the outer cylindrical member to the vibration damping linking target member, and
  the installation bracket installed to the outer cylindrical member penetrates through the magnetic path formation part.

12. The fluid-filled vibration damping device as claimed in claim 11, wherein the inner circumferential magnetic path extends along an inner circumferential side of the magnetic field generation part in the axial direction, and the magnetic path formation part comprises an outer circumferential magnetic path extending along an outer circumferential side of the magnetic field generation part in the axial direction,
  the magnetic gap part of the magnetic path formation part is formed on the inner circumferential magnetic path of the magnetic path formation part, and
  the installation bracket penetrates through the outer circumferential magnetic path of the magnetic path formation part and protrudes toward an outer circumference.

13. The fluid-filled vibration damping device as claimed in claim 12, wherein a plurality of magnetic field generation parts are arranged on two sides with respect to the installation part of the outer cylindrical member in the axial direction.

14. The fluid-filled vibration damping device as claimed in claim 12, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and
  the magnetic gap part is provided between inner circumferential wall parts of the two groove-shaped metal fittings.

15. The fluid-filled vibration damping device as claimed in claim 11, wherein a plurality of magnetic field generation parts are arranged on two sides with respect to the installation part of the outer cylindrical member in the axial direction.

16. The fluid-filled vibration damping device as claimed in claim 11, wherein the magnetic path formation part is formed by two groove-shaped metal fittings that are in concave shapes open toward an inner side in the axial direction and face each other,
  the magnetic field generation part is arranged on an inner side of each of the groove-shaped metal fittings, and the magnetic gap part is provided between inner circumferential wall parts of the two groove-shaped metal fittings.

17. The fluid-filled vibration damping device as claimed in claim 10, wherein a plurality of magnetic field generation parts are arranged on two sides with respect to the installation part of the outer cylindrical member in the axial direction.

18. The fluid-filled vibration damping device as claimed in claim 17, wherein the magnetic path formation part is formed by two groove-shaped metal fittings that are in concave shapes open toward an inner side in the axial direction and face each other,
    the magnetic field generation part is arranged on an inner side of each of the groove-shaped metal fittings, and
    the magnetic gap part is provided between inner circumferential wall parts of the two groove-shaped metal fittings.

19. The fluid-filled vibration damping device as claimed in claim 10, wherein the magnetic path formation part is formed by two groove-shaped metal fittings that are in concave shapes open toward an inner side in the axial direction and face each other,
    the magnetic field generation part is arranged on an inner side of each of the groove-shaped metal fittings, and
    the magnetic gap part is provided between inner circumferential wall parts of the two groove-shaped metal fittings.

* * * * *